United States Patent
Su et al.

(10) Patent No.: US 12,175,596 B2
(45) Date of Patent: Dec. 24, 2024

(54) INDOOR STRUCTURE SEGMENTATION METHOD BASED ON LASER MEASUREMENT POINT CLOUD

(71) Applicants: Shandong Jianzhu University, Shandong (CN); Big Data Development Center, MARA, PRC, Beijing (CN)

(72) Inventors: Fei Su, Shandong (CN); Yaohui Liu, Shandong (CN); Yingkun Du, Shandong (CN); Jingxue Bi, Shandong (CN); Guoqiang Zheng, Shandong (CN); Mingyang Yu, Shandong (CN)

(73) Assignees: Shandong Jianzhu University, Shandong (CN); Big Data Development Center, MARA, PRC, Beijing (CN)

( * ) Notice: Subject to any disclaimer, the term of this patent is extended or adjusted under 35 U.S.C. 154(b) by 155 days.

(21) Appl. No.: 18/118,714

(22) Filed: Mar. 7, 2023

(65) Prior Publication Data
US 2024/0303916 A1    Sep. 12, 2024

(51) Int. Cl.
*G06T 17/00* (2006.01)
*G06T 3/40* (2024.01)
(Continued)

(52) U.S. Cl.
CPC ............... *G06T 17/00* (2013.01); *G06T 3/40* (2013.01); *G06T 7/11* (2017.01); *G06T 7/64* (2017.01);
(Continued)

(58) Field of Classification Search
CPC ... G06T 17/00; G06T 3/40; G06T 7/11; G06T 7/64; G06T 2207/1002; G06T 2207/20016; G06V 10/761; G06V 10/764
See application file for complete search history.

(56) References Cited

U.S. PATENT DOCUMENTS

| | | | | |
|---|---|---|---|---|
| 2016/0154999 | A1* | 6/2016 | Fan | G06T 7/155 |
| | | | | 382/103 |
| 2017/0116781 | A1* | 4/2017 | Babahajiani | G06T 15/506 |
| 2023/0186647 | A1* | 6/2023 | Mahata | G01S 17/86 |
| | | | | 382/103 |

FOREIGN PATENT DOCUMENTS

| | | | |
|---|---|---|---|
| CN | 112288857 A | * | 1/2021 |
| CN | 117197159 A | * | 12/2023 |
| CN | 118135220 B | * | 8/2024 |

* cited by examiner

*Primary Examiner* — Sing-Wai Wu
*Assistant Examiner* — Khoa Vu
(74) *Attorney, Agent, or Firm* — CM Law PLLC; Robert C. Klinger (57) ABSTRACT

The present disclosure discloses an indoor structure segmentation method based on a laser measurement point cloud. The method includes the following steps: inputting an indoor three-dimensional point cloud, and performing supervoxel segmentation of the point cloud using a toward better boundary preserved supervoxel (TBBPS) segmentation method based on a given initial resolution r to extract a plane supervoxel unit; extracting surface point units in surface supervoxels by means of curvatures and normal vector changes; fitting an indoor plane model based on plane supervoxels; fitting an indoor surface model using a cylindrical simplex based on surface points; and based on an α-expansion optimization algorithm, allocating the extracted supervoxel units and surface point units to an optimal model, so as to realize unit classification and segmentation.

5 Claims, 4 Drawing Sheets

(51) Int. Cl.
*G06T 7/11* (2017.01)
*G06T 7/64* (2017.01)
*G06V 10/74* (2022.01)
*G06V 10/764* (2022.01)

(52) U.S. Cl.
CPC .......... *G06V 10/761* (2022.01); *G06V 10/764* (2022.01); *G06T 2207/10028* (2013.01); *G06T 2207/20016* (2013.01)

INDOOR STRUCTURE SEGMENTATION METHOD BASED ON LASER MEASUREMENT POINT CLOUD

TECHNICAL FIELD

The present disclosure belongs to the technical field of cartography, and in particular, to an indoor structure segmentation method based on a laser measurement point cloud.

BACKGROUND

With the rapid development of economic activities, the number of buildings has increased substantially, and human indoor activities have increased significantly. In addition, the internal structure of the building is also gradually enlarged and complicated.

Therefore, the understanding and cognitive needs of indoor environment is also increasing, and understanding and recognition of indoor scenes has aroused extensive attention. Indoor structure extraction and segmentation, as the basic part and main component of indoor scene understanding, is of great significance in indoor environment cognition and understanding.

It is time-consuming and laborious to manually segment and recognize indoor structures by traditional measuring means. With the development of laser sensor technology, the segmentation and recognition of indoor structures based on laser point cloud has the advantages of high speed and high precision, and has become a research hotspot of indoor scene understanding and recognition. However, there are still some problems in indoor structure segmentation based on indoor three-dimensional point cloud, such as large area missing of wall information caused by mutual occlusion of indoor facilities, noise and measurement errors caused by strong reflective surfaces such as indoor windows and glass, and surface oversegmentation caused by difficulty of surface structure fitting. The above problems bring great difficulties to the automatic segmentation and recognition of indoor structures.

SUMMARY

In order to solve the above technical problems, the present disclosure provides a technology to realize automatic segmentation of indoor structures by taking an indoor three-dimensional point cloud containing noise and occlusion as an input, and provides an effective data basis for subsequent indoor scene understanding and three-dimensional modeling.

A technical solution adopted by the present disclosure is an indoor structure segmentation method based on a laser measurement point cloud, including the following steps:

step 1, inputting an indoor three-dimensional point cloud, and pre-segmenting the point cloud based on multi-resolution supervoxels to extract plane supervoxels, where the step includes the following sub-steps:

step 1.1, performing supervoxel segmentation of the point cloud using a toward better boundary preserved supervoxel (TBBPS) segmentation method based on a given initial resolution r to generate a supervoxel set;

step 1.2, classifying the supervoxels into plane supervoxels and surface supervoxels, and storing the plane supervoxels in a plane supervoxel set PC and the surface supervoxels in a new point set NPC;

step 1.3, based on a current resolution $r=r*r_{dio}$, performing TBBPS segmentation on points in the NPC to generate a new supervoxel set C', and emptying the points in the NPC;

step 1.4, repeating step 1.2 for the new set C'; and step 1.5, if the NPC is not empty after execution, repeating steps 1.3 and 1.4; and repeating iteration until the NPC is empty or the current resolution r is less than a given resolution threshold $r_{min}$ to obtain the plane supervoxel set PC;

step 2, extracting a surface supervoxel interior point set based on the TBBPS segmentation method, where the step includes the following sub-steps:

step 2.1, performing supervoxel segmentation of the point cloud using the TBBPS segmentation method based on a given resolution r to generate a supervoxel set of the point cloud; and step 2.2, for each supervoxel, storing interior points of the surface supervoxels in a surface point set NP using the method of step 1.2;

step 3, extracting a plane model by taking the plane supervoxel as a unit, where the step includes the following sub-steps:

step 3.1, calculating a curvature of each supervoxel $pc_i$ ∈PC, and sorting the curvatures from small to large;

step 3.2, selecting a supervoxel $pc_s$ with a minimum curvature, calculating a central point and normal vector of $pc_s$, and establishing a plane model $\eta_s$;

step 3.3, traversing other supervoxels $pc_i$ ∈PC in the supervoxel set, and if an included angle of normal vectors between $pc_i$ and $\eta_s$ is less than an angle threshold $\theta_{th}$, and a distance between $pc_i$ and $\eta_s$ on the $\eta_s$ normal vector is less than a distance threshold $\theta_{th}$, classifying $pc_i$ into $\eta_s$;

step 3.4, if a number of supervoxels in $\eta_s$ is greater than a number threshold $N_{max}$, reserving $\eta_s$; otherwise, deleting $\eta_s$, finding $pc_s'$ ∈PC with a second minimum curvature, establishing a plane model $\eta_s'$, and repeating steps 3.3 and 3.4;

step 3.5, for unclassified supervoxels in the PC, running steps 3.2 to 3.4 iteratively until all the supervoxels are classified;

step 3.6, reserving a model with a largest number of supervoxels, storing the model in a plane model set MS, and deleting the remaining models; and step 3.7, repeating steps 3.2 to 3.6 until all of the supervoxels in PC are classified or the plane model set MS is no longer added with a model;

step 4, fitting a surface model in a surface unit by taking points in the NP as the surface unit and a cylindrical model as a model monomer and using a RANdom SAmple Consensus (RANSAC) method, and saving a surface model set MC; and step 5, based on α-expansion optimization, allocating the supervoxel units and surface point units extracted in steps 1 and 2 to an optimal model, namely the surface or plane model established in steps 3 and 4, to realize unit classification, so as to realize extraction and segmentation of the indoor structure, where the step includes the following sub-steps:

step 5.1, calculating a distance from each supervoxel $pc_i$ ∈PC to each model, and normalizing the distance to 0-1;

step 5.2, calculating a distance from each surface point $p_i$ ∈NP to each model, and normalizing the distance to 0-1;

step 5.3, regarding matching of the supervoxel unit and the surface point unit with the surface model and the plane model as searching a matrix x* which minimizes a matching error on the basis of ensuring a minimum number of models, and minimizing the objective function by the α-expansion algorithm to achieve optimal matching of the unit and the model; and step 5.4, marking matched segmented units with different colors, and outputting segmentation results to complete indoor structure segmentation.

Preferably, a method for classifying the supervoxels in step 1.2 is as follows:

step 1.2.1, for each supervoxel $c_i$, calculating a central point $p_c$ of the supervoxel using $\Sigma_{j=1}^{n} p_j/n$, and solving a covariance matrix $C_{3\times 3}$ of a point set in $c_i$ about the central point $p_c$ according to coordinates of the central point; and step 1.2.2, calculating three eigenvalues $\lambda_1^C$, $\lambda_2^C$ and $\lambda_3^C$ of the covariance matrix $C_{3\times 3}$, where $\lambda_1^C \leq \lambda_2^C \leq \lambda_3^C$; and if the eigenvalues of $c_i$ satisfy Formula 1 and Formula 2, classifying the supervoxel $c_i$ into plane supervoxels; otherwise, classifying the supervoxel $c_i$ into surface supervoxels:

$$\sqrt{\lambda_2^C} > \frac{\sqrt{\lambda_3^C} + \sqrt{\lambda_1^C}}{2}, \text{ and} \quad (1)$$

$$\sqrt{\lambda_2^C} > 2 * \sqrt{\lambda_1^C}. \quad (2)$$

Preferably, a method for calculating the distance from the supervoxel to the model and normalizing the distance in step 5.1 is as follows:

step 5.1.1, calculating a distance from each point $p_k \in pc$ in the supervoxel to the model distance distance($p_k$, $m_i$), where a formula is as follows:

$$\text{distance}(p_k, m_i) = \begin{cases} \left| \frac{n_m \cdot p_k - n_m \cdot p_m}{|n_m|} \right|, m_i \in MS \\ W \cdot \|p_k - p_t\| \cdot \sin\theta - r|, m_i \in MC \\ 2 * \gamma_{th}, \text{ if distance}(p_k, m_i) > 2 * \gamma_{th} \end{cases} \quad (3)$$

where $n_m$ represents the normal vector of the plane model, $p_m$ represents coordinates of a central point, $p_k$ represents coordinates of the surface point, $p_t$ represents a central point of the cylindrical model, r represents a radius of the cylinder, θ represents an included angle between a $p_k$ normal vector and an axial direction vector of the cylinder, W is a weight ranging from 0.2 to 0.5, $$\left| \frac{n_m \cdot p_k - n_m \cdot p_m}{|n_m|} \right|$$

represents a shortest distance from the surface point $p_k$ to the plane model $m_i \in MS$, $\|p_k-p_t\|\cdot\sin \theta-r|$ represents that a distance from $p_k$ to the surface model $m_i \in MC$ is regarded as a difference between a minimum distance from the point to the central axis of the cylindrical model and the radius of the cylinder, $\gamma_{th}$ represents the distance threshold and is influenced by precision of a three-dimensional point cloud acquisition device, and if the acquisition device is based on fixed station scanning, $\gamma_{th}$ is valued within 0.5-1 cm; and if the acquisition device is a mobile measuring device, $\gamma_{th}$ is valued within 2-5 cm;

step 5.1.2, regarding a distance from the supervoxel pc to the model $m_i$ as a sum of distances from points $p_k \in pc$ in the supervoxel to the model $m_i$, where a calculation formula is shown in Formula 4:

$$\text{dist}(pc, m_i) = \Sigma_{p_k \in pc} \text{distance}(p_k, m_i), m_i \in MS \text{ or } MC \quad (4); \text{ and}$$

step 5.1.3, normalizing a distance from the supervoxel to the model dist(pc, $m_i$) to 0-1, where a normalization equation is shown in Formula 5:

$$\text{dist}(pc, m_i) = \frac{\text{dist}(pc, m_i) - \min (\text{dist})}{\max(\text{dist}) - \min(\text{dist})}, \quad (5)$$

where max (dist) and min(dist) respectively represent maximum and minimum distances from the supervoxel to the model.

Preferably, a method for calculating the distance from the surface point to the model and normalizing the distance in step 5.2 is as follows:

step 5.2.1, calculating a distance from the surface point to the model distance ($p_i$, $m_i$), where a formula is as follows:

$$\text{distance}(p_i, m_i) = \begin{cases} \left| \frac{n_m \cdot p_i - n_m \cdot p_m}{|n_m|} \right|, m_i \in MS \\ W \cdot \|p_i - p_t\| \cdot \sin\theta - r|, m_i \in MC \\ 2 * \gamma_{th}, \text{ if distance}(p_i, m_i) > 2 * \gamma_{th} \end{cases} \quad (6)$$

where $p_i$ represents coordinates of the surface point, θ represents an included angle between a $p_i$ normal vector and an axial direction vector of the cylinder, W is a weight ranging from 0.2 to 0.5, $$\left| \frac{n_m \cdot p_i - n_m \cdot p_m}{|n_m|} \right|$$

represents a shortest distance from the surface point $p_i$ to the plane model $m_i \in MS$, $\|p_i-p_t\|\cdot\sin \theta-r|$ represents that a distance from $p_i$ to the surface model $m_i \in MC$ is regarded as a difference between a minimum distance from the point to the central axis of the cylindrical model and the radius of the cylinder, $\gamma_{th}$ represents the distance threshold and is influenced by precision of the three-dimensional point cloud acquisition device, and if the acquisition device is based on fixed station scanning, $\gamma_{th}$ is valued within 0.5-1 cm; and if the acquisition device is a mobile measuring device, $\gamma_{th}$ is valued within 2-5 cm; and step 5.2.2, normalizing a distance from each surface point $p_i \in NP$ to each model $m_i$ distance($p_i$, $m_i$) using Formula 7:

$$\text{distance}(p, m_i) = \frac{\text{distance}(p, m_i) - \min (\text{distance})}{\max(\text{distance}) - \min(\text{distance})}, \quad (7)$$

where max (distance) and min(distance) respectively represent maximum and minimum distances from the surface point to the model.

Preferably, a process of searching a matrix x* in step 5.3 is set as follows:

$$x^* = \underset{x}{\text{argmin}}\left(\sum_{i=1}^{N} \|p_i - m_{li}\| + \beta \cdot K\right), x \in \{0, 1\}_{N \times K}, \quad (8)$$

where N is a total number of the supervoxel units and the surface point units, and K is a total number of the surface models and the plane models.

Compared with the prior art, the present disclosure has the following beneficial effects: a simple and effective indoor structure extraction and segmentation technique is provided, which ensures the segmentation stability of indoor surface structure. Existing point cloud segmentation methods focus on plane structure rather than surface structure. Although the RANSAC method can achieve surface segmentation through regular model fitting, it is affected by the random sampling uncertainty and cannot effectively counteract the noise and outliers in the data, which is easy to produce false surface errors. In order to ensure the sampling consistency of the same structure, the method uses multi-resolution supervoxels as the unit to fit the model to avoid false models. Based on the framework of "pre-segmentation-surface separate fitting-model matching", the indoor structure segmentation and extraction can be realized quickly and efficiently. The method is also suitable for indoor positioning and indoor mapping.

DETAILED DESCRIPTION OF THE EMBODIMENTS

In order to facilitate the understanding and implementation of the present disclosure by those of ordinary skill in the art, the present disclosure is further described in detail in combination with the accompanying drawings and embodiments. It should be understood that the embodiments described here are only used to illustrate and explain the present disclosure, not to limit the present disclosure.

Indoor scene understanding through point cloud has always been the focus of research, and indoor structure segmentation and extraction has always been the prerequisite and research basis of indoor scene understanding. In this context, the present disclosure provides an indoor structure segmentation method based on a laser measurement point cloud, which transforms the segmentation of indoor structure into supervoxel segmentation and matching by pre-segmentation of supervoxel, so as to further refine the problem. The method of present disclosure includes the following steps.

Figure 1:
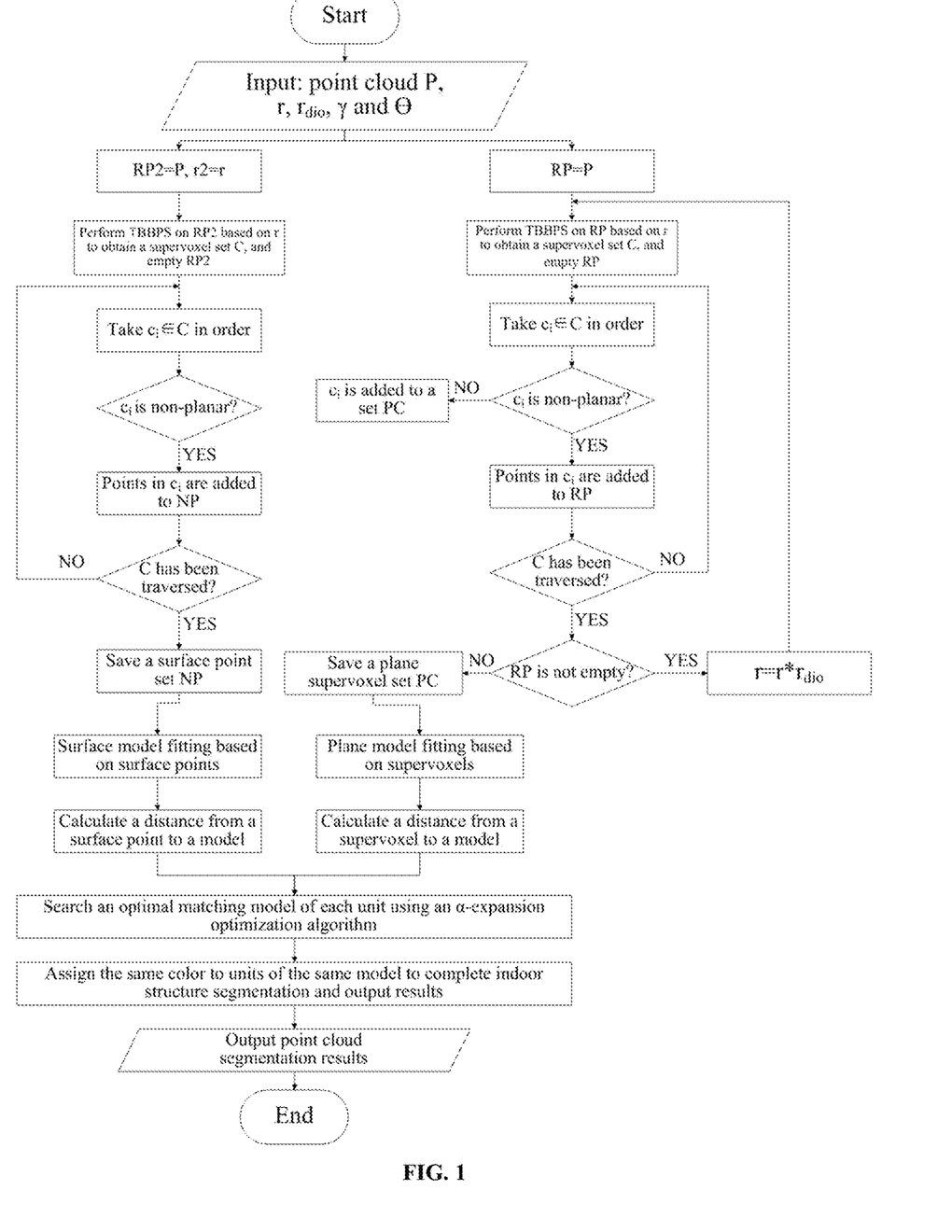
FIG. 1 is a flow chart of indoor structure segmentation in an embodiment of the present disclosure.
Figure 2:
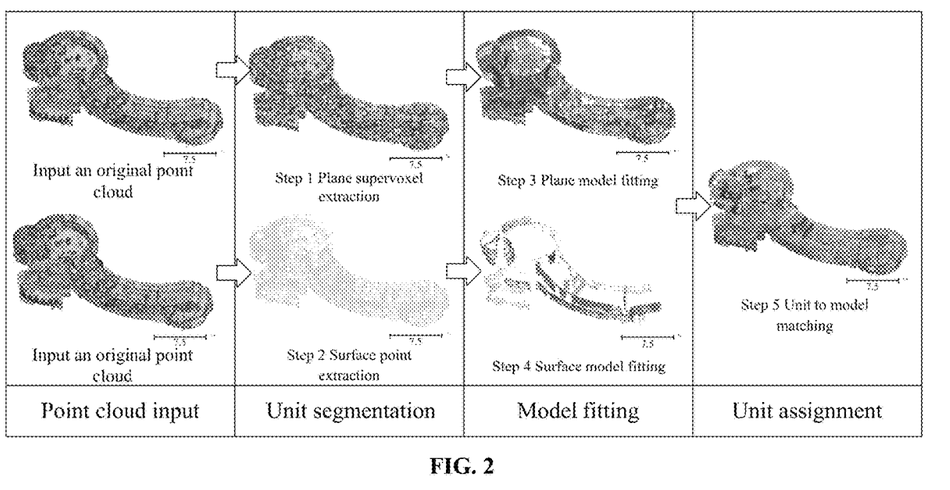
FIG. 2 shows an example of indoor structure segmentation in the embodiment of the present disclosure.
Figure 3:
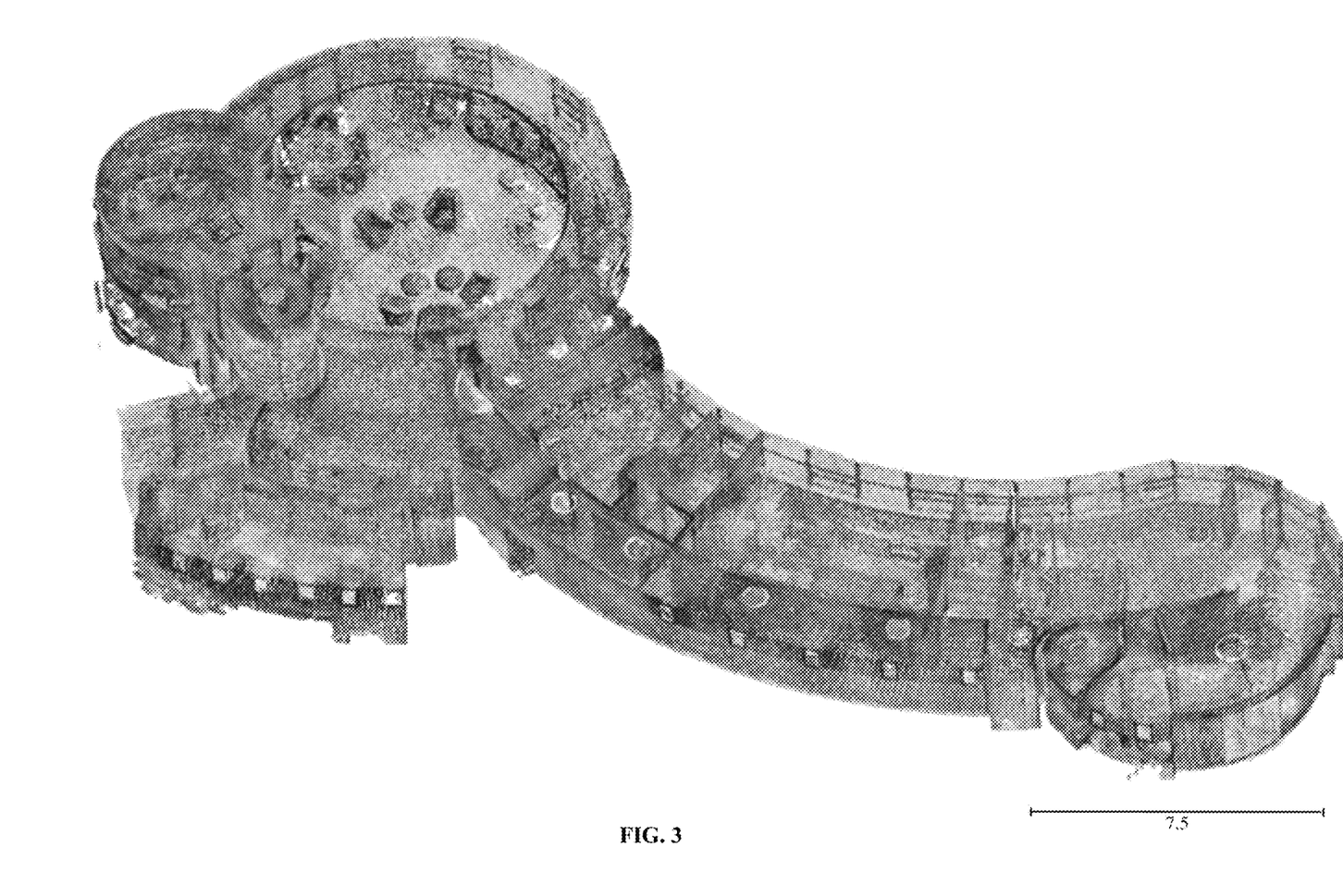
FIG. 3 show an indoor point cloud input in the embodiment of the present disclosure.
Figure 4:
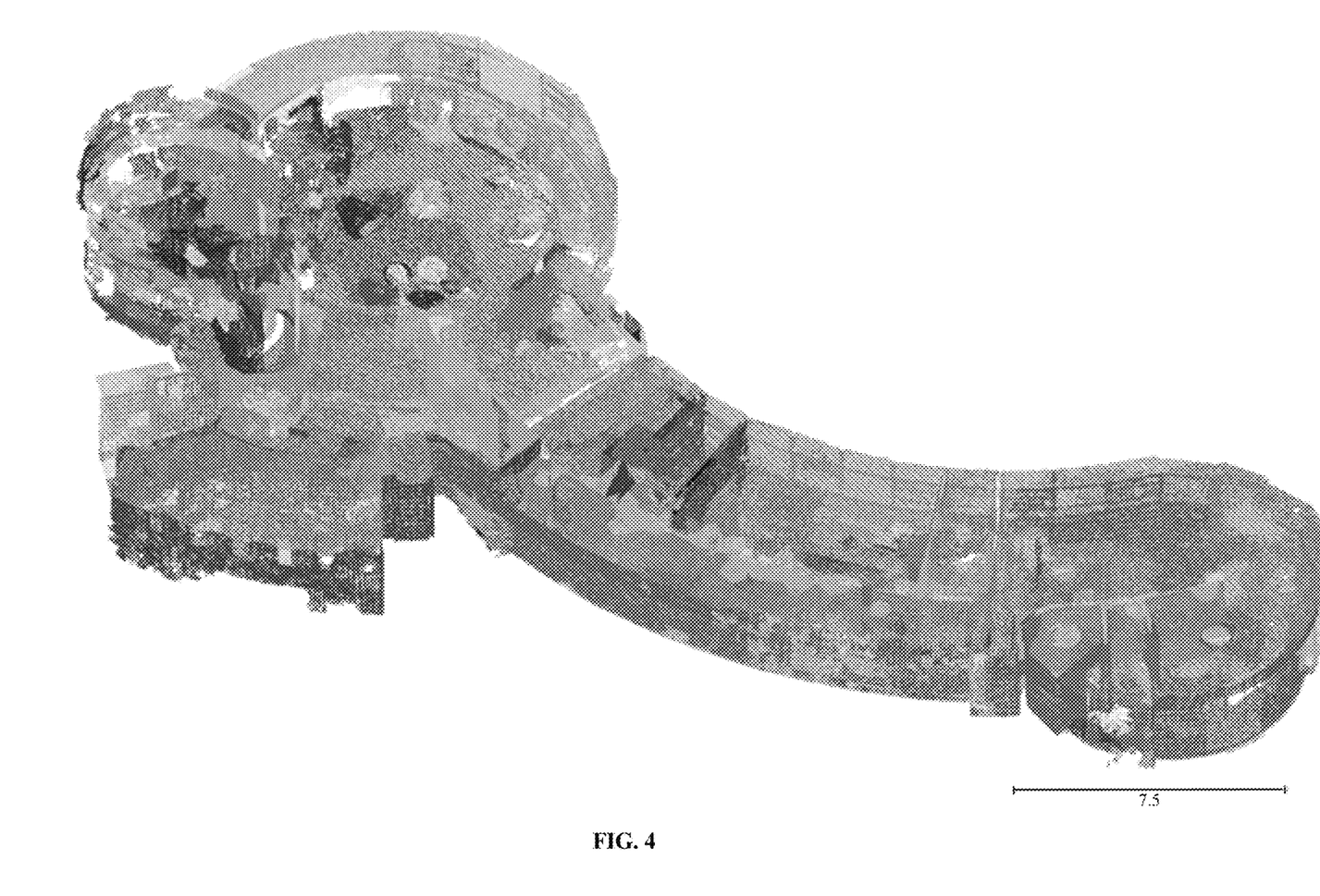
FIG. 4 shows indoor segmentation results output in the embodiment of the present disclosure.

Step 1, An indoor three-dimensional point cloud is input, and the point cloud is pre-segmented based on multi-resolution supervoxels to extract plane supervoxels. The step includes the following sub-steps.

Step 1.1, Supervoxel segmentation of the point cloud is performed using a TBBPS [1] supervoxel segmentation method based on a given initial resolution r to generate a supervoxel set $c_i \in C$. Each segmented point cloud cluster represents a supervoxel.

Step 1.2, For each supervoxel $c_i \in C$, a central point $p_c$ of the supervoxel is calculated using $\Sigma_{j=1}^{n} p_j/n$, and a covariance matrix $C_{3\times3}$ of a point set about the central point $p_c$ is solved according to coordinates of the central point. Three eigenvalues $\lambda_1^C$, $\lambda_2^C$ and $\lambda_3^C$ of $C_{3\times3}$ are calculated, where $\lambda_1^C \leq \lambda_2^C \leq \lambda_3^C$. If the eigenvalues of $c_i$ satisfy Formula 1 and Formula 2, the supervoxel $c_i$ is stored in the plane supervoxel set PC. Otherwise, the supervoxel $c_i$ is stored in the surface supervoxel set NPC:

$$\sqrt{\lambda_2^C} > \frac{\sqrt{\lambda_3^C} + \sqrt{\lambda_1^C}}{2}, \text{ and} \tag{1}$$

$$\sqrt{\lambda_2^C} > 2 * \sqrt{\lambda_1^C}. \tag{2}$$

Step 1.3, A current resolution r is modified to $r*r_{dio}$. For points in the NPC, the TBBPS [1] supervoxel segmentation method is used again based on the current resolution r to generate a new supervoxel set $c_i' \in C'$. Supervoxels in the NPC are emptied.

Step 1.4, Step 1.2 is repeated for the new set C'.

Step 1.5, If the NPC is not empty after execution, steps 1.3 and 1.4 are repeated. Iteration is repeated until the NPC is empty or the current resolution r is less than a given resolution threshold $r_{min}$ to obtain the plane supervoxel set PC.

Step 2, A surface supervoxel interior point set is extracted based on the TBBPS segmentation method. The step includes the following sub-steps.

Step 2.1, Supervoxel segmentation of the point cloud is performed using the TBBPS [1] segmentation method based on a given resolution r to generate a supervoxel set of the point cloud $c_i \in C$. Each segmented point cloud cluster represents a supervoxel.

Step 2.2, For each supervoxel $c_i \in C$, a central point $p_c$ of the supervoxel is calculated using $\Sigma_{j=1}^{n} p_j/n$, and a covariance matrix $C_{3\times3}$ of a point set about the central point $p_c$ is solved according to coordinates of the central point. Three eigenvalues $\lambda_1^C$, $\lambda_2^C$ and $\lambda_3^C$ of $C_{3\times3}$ are calculated. If the eigenvalues of $c_i$ do not satisfy Formula 1 or Formula 2, the supervoxel $c_i$ is stored in the surface supervoxel set NPC. The point set in each surface supervoxel $c_i \in NPC$ is stored in the point set NP.

Step 3, A plane model is extracted by taking the plane supervoxel $pc_i \in PC$ as a unit. The step includes the following sub-steps.

Step 3.1. In the PC, a curvature of each $pc_i \in PC$ is calculated, the curvature Curve is calculated as shown in Formula 3, and the curvatures Curve are sorted from small to large:

$$\text{Curve} = \lambda_1^C/(\lambda_1^C + \lambda_2^C + \lambda_3^C). \tag{3}$$

Step 3.2, A supervoxel $pc_s \in PC$ with a minimum curvature is selected, a central point and normal vector of $pc_s$ are calculated, and a plane model $\eta_s$ is established. The plane model is shown in Formula 4:

$$\eta_s = \begin{cases} F_1 = \text{centerpoint}(x_s, y_s, z_s) \\ F_2 = \text{normal}(nx_s, ny_s, nz_s) \end{cases}, \tag{4}$$

where $\eta_s$ has two parameters $F_1$ and $F_2$. $F_1$ represents the coordinates of the central point of the plane, where $x_s$, $y_s$, and $Z_s$ respectively represent the coordinates of the x-axis, y-axis and z-axis of the central point. $F_2$ represents the normal vector of the plane, where $nx_s$, $ny_s$, and $nz_s$ describe the direction and length information of the normal vector.

Step 3.3, Other supervoxels $pc_i \in PC$ in the PC are traversed. If an included angle of normal vectors between $pc_i$ and $\eta_s$ is less than an angle threshold $\theta_{th}$, and a distance between $pc_i$ and $\eta_s$ on the $\eta_s$ normal vector is less than a distance threshold $\gamma_{th}$, $pc_i$ is classified into $\eta_s$.

Step 3.4, If a number of supervoxels in $\eta_s$ is greater than a number threshold $N_{max}$, $\eta_s$ is reserved. Otherwise, $\eta_s$ is deleted, $pc_s' \in PC$ with a second minimum curvature is found, a plane model $\eta_s'$ is established, and steps 3.3 and 3.4 are repeated.

Step 3.5, For unclassified supervoxels in the PC, steps 3.2 to 3.4 are run iteratively until all the supervoxels are classified.

Step 3.6, A model with a largest number of supervoxels $\eta_{max}$ is reserved and is stored in a plane model set MS, and the remaining models are deleted.

Step 3.7, Steps 3.2 to 3.6 are repeated until all of the supervoxels in PC are classified or the plane model set MS is no longer added with a model.

Step 4, A surface model in a surface unit is fit by taking a surface point $np_i \in NP$ as a unit and a cylindrical model as a model monomer and using an RANSAC method [2], and a surface model set MC is saved.

Step 5, Based on α-expansion optimization, the supervoxel units and surface point units extracted in steps 1 and 2 are allocated to an optimal model (the surface or plane model established in steps 3 and 4), so as to classify and segment the units, thus realizing extraction and segmentation of the indoor structure. The step includes the following sub-steps.

Step 5.1, A distance from each supervoxel $pc \in PC$ to each model $dist(pc, m_i)$ is calculated, and the distance calculation is shown in Formula 5. The supervoxel $pc$ to the model $m_i$ can be described as: the sum of distances from each point $p_k \in pc$ in the pc to the model $m_i$, while the distance from point to model is shown in Formula 6:

$$dist(pc,m_i)=\Sigma_{p_k \in pc} \text{distance}(p_k,m_i), m_i \in MS \text{ or } MC, \quad (5)$$

$$\text{distance}(p_k, m_i) = \begin{cases} \left|\frac{n_m \cdot p_k - n_m \cdot p_m}{|n_m|}\right|, m_i \in MS \\ W \cdot \|p_k - p_t\| \cdot \sin\theta - r|, m_i \in MC \\ 2*\gamma_{th}, \text{ if distance}(p_k, m_i) > 2*\gamma_{th} \end{cases} \quad (6)$$

where $n_m$ represents the normal vector of the plane model, $p_m$ represents coordinates of a central point, $p_k$ represents coordinates of the surface point, $p_t$ represents a central point of the cylindrical model, $r$ represents a radius of the cylinder, $\theta$ represents an included angle between a $p_k$ normal vector and an axial direction vector of the cylinder, $W$ is a weight ranging from 0.2 to 0.5, $$\left|\frac{n_m \cdot p_k - n_m \cdot p_m}{|n_m|}\right|$$

represents a shortest distance from the surface point $p_k$ to the plane model $m_i \in MS$, $\|p_k - p_t\| \cdot \sin\theta - r|$ represents that a distance from $p_k$ to the surface model $m_i \in MC$ is regarded as a difference between a minimum distance from the point to the central axis of the cylindrical model and the radius of the cylinder, $\gamma_{th}$ represents the distance threshold and is influenced by precision of a three-dimensional point cloud acquisition device, if the acquisition device is based on fixed station scanning, $\gamma_{th}$ is valued within 0.5-1 cm, and if the acquisition device is a mobile measuring device, $\gamma_{th}$ is valued within 2-5 cm.

After calculation, the distance from the supervoxel to the model dist (pc, $m_i$) is normalized to 0-1. A normalization equation is shown in Formula 7. In the formula, max (dist) and min(dist) respectively represent maximum and minimum distances from the supervoxel to the model.

$$dist(pc, m_i) = \frac{dist(pc, m_i) - \min(dist)}{\max(dist) - \min(dist)} \quad (7)$$

Step 5.2, A distance from each surface point $p_i \in NP$ to each model $m_i$ distance ($p_i$, $m_i$) is calculated, as shown in Formula 8. A distance from each surface point $p_i$ to the plane model $m_i \in MS$ can be regarded as the shortest distance from the point to the plane, namely $$\left|\frac{n_m \cdot p_i - n_m \cdot p_m}{|n_m|}\right|,$$

where $n_m$ and $p_m$ respectively represent the normal vector and central point coordinates of the plane model, while $p_i$ represents the coordinates of the surface point. The distance from $p_i$ to the surface model $m_i \in MC$ can be regarded as a difference between a minimum distance from the point to the central axis of the cylindrical model and the radius of the cylinder, namely $\|p_i-p_t\| \cdot \sin\theta - r|$, where $p_t$ and $r$ represent the central point and radius of the cylindrical model respectively, and $\theta$ represents an included angle between a $p_i$ normal vector and an axial direction vector of the cylinder. Since the fitting accuracy of the plane model is higher than that of the surface model, the distance from the point to the surface model needs to be multiplied by the weight $W$ in order to balance the fitting error. If the distance from the point to the model is greater than twice the distance threshold value $\gamma_{th}$, this point can be regarded as the outlier of the model. Therefore, the distance is set as $2*\gamma_{th}$.

$$\text{distance}(p_i, m_i) = \begin{cases} \left|\frac{n_m \cdot p_i - n_m \cdot p_m}{|n_m|}\right|, m_i \in MS \\ W \cdot \|p_i - p_t\| \cdot \sin\theta - r|, m_i \in MC \\ 2*\gamma_{th}, \text{ if distance }(p_i, m_i) > 2*\gamma_{th} \end{cases} \quad (8)$$

where $p_i$ represents coordinates of the surface point, $\theta$ represents an included angle between a $p_i$ normal vector and an axial direction vector of the cylinder, $W$ is a weight ranging from 0.2 to 0.5, $$\left|\frac{n_m \cdot p_i - n_m \cdot p_m}{|n_m|}\right|$$

represents a shortest distance from the surface point $p_i$ to the plane model $m_i \in MS$, $\|p_i-p_t\| \cdot \sin\theta - r|$ represents that a distance from $p_i$ to the surface model $m_i \in MC$ is regarded as a difference between a minimum distance from the point to the central axis of the cylindrical model and the radius of the cylinder, $\gamma_{th}$ represents the distance threshold and is influenced by precision of the three-dimensional point cloud acquisition device, and if the acquisition device is based on fixed station scanning. $\gamma_{th}$ is valued within 0.5-1 cm; and if the acquisition device is a mobile measuring device, $\gamma_{th}$ is valued within 2-5 cm.

After calculation, the distance from each surface point $p_i \in NP$ to each model $m_i$ distance($p_i$, $m_i$) is normalized to 0-1. A normalization method is shown in Formula 9 in step 5.1.

$$\text{distance } (p, m_i) = \frac{\text{distance } (p, m_i) - \min(\text{distance})}{\max(\text{distance}) - \min(\text{distance})}, \quad (9)$$

where max (distance) and min(distance) respectively represent maximum and minimum distances from the surface point to the model.

Step 5.3, Unit segmentation (supervoxel units and surface point units, total number of N units) has been completed in steps 1 and 2, model fitting (surface models and plane models, total number of K models) has been completed in steps 3 and 4, and the matching distance between each unit and the model have been calculated in steps 5.1 and 5.2. Therefore, the structure segmentation of point cloud can be regarded as searching an N-row and K-column matrix x* which minimizes a matching error on the basis of ensuring a minimum number of models, as shown in Formula 8.

$$x^* = \underset{x}{\mathrm{argmin}}\left(\sum_{i=1}^{N}\|p_i - m_{ii}\| + +\beta \cdot K\right), x \in \{0, 1\}_{N \times K} \quad (8)$$

The $\alpha$-expansion optimization algorithm is used to minimize Formula 8, so as to find the optimal corresponding model for each unit.

Step 5.4, The segmented units are marked with different colors, and the segmentation results are output to complete indoor structure segmentation.

When implemented, the above method can be automatically operated by computer software technology, and the device running the method of the present disclosure shall also be within the scope of protection.

The above descriptions show merely one embodiment of the present disclosure, and is not intended to limit the present disclosure. Any modifications, improvements, etc. made within the spirit and principle of the present disclosure should be included within the protection scope of the present disclosure.

What is claimed is:

1. An indoor structure segmentation method based on a laser measurement point cloud, comprising the following steps:

step 1, inputting an indoor three-dimensional point cloud, and pre-segmenting the point cloud based on multi-resolution supervoxels to extract plane supervoxels, wherein the step comprises the following sub-steps:

step 1.1, performing supervoxel segmentation of the point cloud using a toward better boundary preserved supervoxel (TBBPS) segmentation method based on a given initial resolution r to generate a supervoxel set;

step 1.2, classifying the supervoxels into plane supervoxels and surface supervoxels, and storing the plane supervoxels in a plane supervoxel set PC and the surface supervoxels in a new point set NPC;

step 1.3, based on a current resolution r=r*$r_{dio}$, performing TBBPS segmentation on points in the NPC to generate a new supervoxel set C', and emptying the points in the NPC;

step 1.4, repeating step 1.2 for the new set C'; and step 1.5, if the NPC is not empty after execution, repeating steps 1.3 and 1.4; and repeating iteration until the NPC is empty or the current resolution r is less than a given resolution threshold $r_{min}$ to obtain the plane supervoxel set PC;

step 2, extracting a surface supervoxel interior point set based on the TBBPS segmentation method, wherein the step comprises the following sub-steps:

step 2.1, performing supervoxel segmentation of the point cloud using the TBBPS segmentation method based on a given resolution r to generate a supervoxel set of the point cloud; and step 2.2, for each supervoxel, storing interior points of the surface supervoxels in a surface point set NP using the method of step 1.2;

step 3, extracting a plane model by taking the plane supervoxel as a unit, wherein the step comprises the following sub-steps:

step 3.1, calculating a curvature of each supervoxel $pc_i \in PC$, and sorting the curvatures from small to large;

step 3.2, selecting a supervoxel $pc_s$ with a minimum curvature, calculating a central point and normal vector of $pc_s$, and establishing a plane model $\eta_s$;

step 3.3, traversing other supervoxels $pc_i \in PC$ in the supervoxel set, and if an included angle of normal vectors between $pc_i$ and $\eta_s$ is less than an angle threshold $\theta_{th}$, and a distance between $pc_i$ and $\eta_s$ on the $\eta_s$ normal vector is less than a distance threshold $\gamma_{th}$, classifying $pc_i$ into $\eta_s$;

step 3.4, if a number of supervoxels in $\eta_s$ is greater than a number threshold $N_{max}$, reserving $\eta_s$; otherwise, deleting $\eta_s$, finding $pc_s' \in PC$ with a second minimum curvature, establishing a plane model $\eta_s'$, and repeating steps 3.3 and 3.4;

step 3.5, for unclassified supervoxels in the PC, running steps 3.2 to 3.4 iteratively until all the supervoxels are classified;

step 3.6, reserving a model with a largest number of supervoxels, storing the model in a plane model set MS, and deleting the remaining models; and step 3.7, repeating steps 3.2 to 3.6 until all of the supervoxels in PC are classified or the plane model set MS is no longer added with a model;

step 4, fitting a surface model in a surface unit by taking points in the NP as the surface unit and a cylindrical model as a model monomer and using a RANdom SAmple Consensus (RANSAC) method, and saving a surface model set MC; and step 5, based on $\alpha$-expansion optimization, allocating the supervoxel units and surface point units extracted in steps 1 and 2 to an optimal model, namely the surface or plane model established in steps 3 and 4, to realize unit classification, so as to realize extraction and segmentation of the indoor structure, wherein the step comprises the following sub-steps:

step 5.1, calculating a distance from each supervoxel $pc_i \in PC$ to each model, and normalizing the distance to 0-1;

step 5.2, calculating a distance from each surface point $p_i \in NP$ to each model, and normalizing the distance to 0-1;

step 5.3, regarding matching of the supervoxel unit and the surface point unit with the surface model and the plane model as searching a matrix x* which minimizes a matching error on the basis of ensuring a minimum number of models, and minimizing the objective function by the α-expansion algorithm to achieve optimal matching of the unit and the model; and step 5.4, marking matched segmented units with different colors, and outputting segmentation results to complete indoor structure segmentation.

2. The indoor structure segmentation method based on a laser measurement point cloud according to claim 1, wherein a method for classifying the supervoxels in step 1.2 is as follows:

step 1.2.1, for each supervoxel $c_i$, calculating a central point $p_c$ of the supervoxel using $\Sigma_{j=1}^{n} p_j/n$, and solving a covariance matrix $C_{3\times 3}$ of a point set in $c_i$ about the central point $p_c$ according to coordinates of the central point; and step 1.2.2, calculating three eigenvalues $\lambda_1^C$, $\lambda_2^C$ and $\lambda_3^C$ of the covariance matrix $C_{3\times 3}$, wherein $\lambda_1^C \leq \lambda_2^C \leq \lambda_3^C$; and if the eigenvalues of $c_i$ satisfy Formula 1 and Formula 2, classifying the supervoxel $c_i$ into plane supervoxels; otherwise, classifying the supervoxel $c_i$ into surface supervoxels:

$$\sqrt{\lambda_2^C} > \frac{\sqrt{\lambda_3^C} + \sqrt{\lambda_1^C}}{2}, \text{ and} \quad (1)$$

$$\sqrt{\lambda_2^C} > 2 * \sqrt{\lambda_1^C}. \quad (2)$$

3. The indoor structure segmentation method based on a laser measurement point cloud according to claim 1, wherein a method for calculating the distance from the supervoxel to the model and normalizing the distance in step 5.1 is as follows:

step 5.1.1, calculating a distance from each point $p_k \in pc$ in the supervoxel to the model distance($p_k$, $m_i$), wherein a formula is as follows:

$$\text{distance}(p_k, m_i) = \begin{cases} \left|\frac{n_m \cdot p_i - n_m \cdot p_m}{|n_m|}\right|, m_i \in MS \\ W \cdot ||p_k - p_t| \cdot \sin\theta - r|, m_i \in MC \\ 2*\gamma_{th}, \text{ if distance}(p_k, m_i) > 2*\gamma_{th} \end{cases} \quad (3)$$

wherein $n_m$ represents the normal vector of the plane model, $p_m$ represents coordinates of a central point, $p_k$ represents coordinates of the surface point, $p_t$ represents a central point of the cylindrical model, r represents a radius of the cylinder, θ represents an included angle between a $p_k$ normal vector and an axial direction vector of the cylinder, W is a weight ranging from 0.2 to 0.5, $$\left|\frac{n_m \cdot p_k - n_m \cdot p_m}{|n_m|}\right|$$

represents a shortest distance from the surface point $p_k$ to the plane model $m_i \in MS$, $||p_k-p_t| \cdot \sin\theta-r|$ represents that a distance from $p_k$ to the surface model $m_i \in MC$ is regarded as a difference between a minimum distance from the point to the central axis of the cylindrical model and the radius of the cylinder, $\gamma_{th}$ represents the distance threshold and is influenced by precision of a three-dimensional point cloud acquisition device, and if the acquisition device is based on fixed station scanning, $\gamma_{th}$ is valued within 0.5-1 cm; and if the acquisition device is a mobile measuring device, $\gamma_{th}$ is valued within 2-5 cm;

step 5.1.2, regarding a distance from the supervoxel pc to the model $m_i$ as a sum of distances from points $p_k \in pc$ in the supervoxel to the model $m_i$, wherein a calculation formula is shown in Formula 4:

$$\text{dist}(pc, m_i) = \Sigma_{p_k \in pc} \text{distance}(p_k, m_i), m_i \in MS \text{ or } MC \quad (4); \text{ and}$$

step 5.1.3, normalizing a distance from the supervoxel to the model dist(pc, $m_i$) to 0-1, wherein a normalization equation is shown in Formula 5:

$$\text{dist}(pc, m_i) = \frac{\text{dist}(pc, m_i) - \min(\text{dist})}{\max(\text{dist}) - \min(\text{dist})}, \quad (5)$$

wherein max(dist) and min(dist) respectively represent maximum and minimum distances from the supervoxel to the model.

4. The indoor structure segmentation method based on a laser measurement point cloud according to claim 3, wherein a method for calculating the distance from the surface point to the model and normalizing the distance in step 5.2 is as follows:

step 5.2.1, calculating a distance from the surface point to the model distance ($p_i$, $m_i$), wherein a formula is as follows:

$$\text{distance}(p_i, m_i) = \begin{cases} \left|\frac{n_m \cdot p_i - n_m \cdot p_m}{|n_m|}\right|, m_i \in MS \\ W \cdot ||p_i - p_t| \cdot \sin\theta - r|, m_i \in MC \\ 2*\gamma_{th}, \text{ if distance}(p_i, m_i) > 2*\gamma_{th} \end{cases} \quad (6)$$

wherein $p_i$ represents coordinates of the surface point, θ represents an included angle between a $p_i$ normal vector and an axial direction vector of the cylinder, W is a weight ranging from 0.2 to 0.5, $$\left|\frac{n_m \cdot p_i - n_m \cdot p_m}{|n_m|}\right|$$

represents a shortest distance from the surface point $p_i$ to the plane model $m_i \in MS$, $||p_i-p_t| \cdot \sin\theta-r|$ represents that a distance from $p_i$ to the surface model $m_i \in MC$ is regarded as a difference between a minimum distance from the point to the central axis of the cylindrical model and the radius of the cylinder, $\gamma_{th}$ represents the distance threshold and is influenced by precision of the three-dimensional point cloud acquisition device, and if the acquisition device is based on fixed station scanning, $\gamma_{th}$ is valued within 0.5-1 cm; and if the acquisition device is a mobile measuring device, $\gamma_{th}$ is valued within 2-5 cm; and step 5.2.2, normalizing a distance from each surface point $p_i \in NP$ to each model $m_i$ distance($p_i$, $m_i$) using Formula 7:

$$\text{distance}(p, m_i) = \frac{\text{distance}(p, m_i) - \min(\text{distance})}{\max(\text{distance}) - \min(\text{distance})}, \quad (7)$$

wherein max(distance) and min(distance) respectively represent maximum and minimum distances from the surface point to the model.

5. The indoor structure segmentation method based on a laser measurement point cloud according to claim 1, wherein a process of searching a matrix x* in step 5.3 is set as follows:

$$x^* = \underset{x}{\operatorname{argmin}}\left(\sum\nolimits_{i=1}^{N} \|p_i - m_{li}\| + \beta \cdot K\right), x \in \{0, 1\}_{N \times K}, \qquad (8)$$

wherein N is a total number of the supervoxel units and the surface point units, and K is a total number of the surface models and the plane models.

\* \* \* \* \*